US009206721B2

(12) United States Patent
Rotter et al.

(10) Patent No.: US 9,206,721 B2
(45) Date of Patent: Dec. 8, 2015

(54) CYCLONIC AIR CLEANER

(71) Applicant: Kohler Co., Kohler, WI (US)

(72) Inventors: Terrence M. Rotter, Sheboygan Falls, WI (US); Jeffrey S. Sayler, Howards Grove, WI (US); Robert J. Hensel, Germantown, WI (US)

(73) Assignee: Kohler Co., Kohler, WI (US)

( * ) Notice: Subject to any disclaimer, the term of this patent is extended or adjusted under 35 U.S.C. 154(b) by 91 days.

(21) Appl. No.: 14/068,854

(22) Filed: Oct. 31, 2013

(65) Prior Publication Data

US 2014/0053796 A1 Feb. 27, 2014

Related U.S. Application Data

(63) Continuation of application No. 12/476,411, filed on Jun. 2, 2009, now Pat. No. 8,808,432.

(60) Provisional application No. 61/061,502, filed on Jun. 13, 2008.

(51) Int. Cl.
*B01D 50/00* (2006.01)
*F01N 3/033* (2006.01)
(Continued)

(52) U.S. Cl.
CPC ............ *F01N 3/033* (2013.01); *B01D 46/0046* (2013.01); *B01D 46/2411* (2013.01); *B01D 50/00* (2013.01); *B01D 50/002* (2013.01); *F02M 35/022* (2013.01); *F02M 35/024* (2013.01)

(58) Field of Classification Search
CPC ............................. B01D 50/00; B01D 50/002
USPC .............. 95/268, 273; 96/380; 55/337, 385.3, 55/428, 432, 459.1, 503, 505
See application file for complete search history.

(56) References Cited

U.S. PATENT DOCUMENTS 2,080,574 A    5/1937  McCoy
2,962,121 A   11/1960  Wilber
(Continued)

FOREIGN PATENT DOCUMENTS

AT    007 768 U1    8/2005
CN    1227810 A    9/1999
(Continued)

OTHER PUBLICATIONS

Chinese Patent Application No. 200980104257.9; First Office Action; Jun. 1, 2012: 18 pages.
(Continued)

*Primary Examiner* — Robert A Hopkins
(74) *Attorney, Agent, or Firm* — Whyte Hirschboeck Dudek S.C.

(57) ABSTRACT

An air cleaner device for filtering intake air including a housing defining a chamber, a filter element disposed within the chamber, and a duct element having a passageway in fluid communication with the chamber. Further, the duct element extends along and downwardly from about a portion of the housing and further includes an inlet for drawing intake air into the chamber. The air cleaner having a base member in fluid communication with the chamber and an outlet, where the air drawn into the chamber is filtered by first and second filtering operations to obtain filtered air, with the first and the second filtering operations accomplished at least in part due to a cyclonic motion of the air and passage of the air through the filter element, respectively; and where the filtered air from the chamber of the housing is released through the outlet in the base member.

20 Claims, 13 Drawing Sheets

(51) Int. Cl.
  *F02M 35/022* (2006.01)
  *F02M 35/024* (2006.01)
  *B01D 46/00* (2006.01)
  *B01D 46/24* (2006.01)

(56) References Cited

U.S. PATENT DOCUMENTS

| | | |
|---|---|---|
| 3,013,628 A | 12/1961 | Jacobs et al. |
| 3,048,959 A | 8/1962 | Lowther |
| 3,078,650 A | 2/1963 | Anderson et al. |
| 3,147,100 A | 9/1964 | Wilber |
| 3,169,844 A | 2/1965 | Young |
| 3,201,927 A | 8/1965 | Wachter |
| 3,319,404 A | 5/1967 | Lowther |
| 3,429,108 A | 2/1969 | Larson |
| 3,617,149 A | 11/1971 | Gibson |
| 3,618,578 A | 11/1971 | Swatman et al. |
| 3,672,130 A | 6/1972 | Sullivan et al. |
| 3,680,286 A | 8/1972 | Nostrand et al. |
| 3,698,161 A | 10/1972 | Brixius et al. |
| 3,730,158 A | 5/1973 | St. Amand |
| 3,745,753 A | 7/1973 | Risse |
| 3,769,798 A | 11/1973 | Whittaker |
| 3,816,982 A | 6/1974 | Regnault |
| 3,832,122 A | 8/1974 | La Haye et al. |
| 3,849,093 A | 11/1974 | Konishi et al. |
| 3,853,518 A | 12/1974 | Tu et al. |
| 3,868,819 A | 3/1975 | Knapp |
| 3,884,658 A | 5/1975 | Roach |
| 3,907,529 A | 9/1975 | Borsheim |
| 3,920,426 A | 11/1975 | Tu et al. |
| 3,923,481 A | 12/1975 | Farrow |
| 3,925,044 A | 12/1975 | Tu et al. |
| 3,928,007 A | 12/1975 | Jackson |
| 3,966,014 A | 6/1976 | Gowing |
| 3,994,067 A | 11/1976 | Hazzard et al. |
| 4,006,000 A | 2/1977 | Tortorici et al. |
| 4,028,076 A | 6/1977 | Fields |
| 4,038,051 A | 7/1977 | Ide |
| 4,133,847 A | 1/1979 | Feuerman |
| 4,135,899 A | 1/1979 | Gauer |
| 4,168,686 A | 9/1979 | Wakita et al. |
| 4,197,101 A | 4/1980 | Cote, Jr. et al. |
| 4,197,102 A | 4/1980 | Decker |
| 4,222,755 A | 9/1980 | Grotto |
| 4,227,898 A | 10/1980 | Kamekawa et al. |
| 4,233,043 A | 11/1980 | Catterson |
| 4,235,609 A | 11/1980 | Garigioli |
| 4,242,115 A | 12/1980 | Harold et al. |
| 4,243,397 A | 1/1981 | Tokar et al. |
| 4,248,613 A | 2/1981 | Linhart |
| 4,261,710 A | 4/1981 | Sullivan |
| 4,278,455 A | 7/1981 | Nardi |
| 4,331,459 A | 5/1982 | Copley |
| 4,342,576 A | 8/1982 | Seki et al. |
| 4,350,509 A | 9/1982 | Alseth et al. |
| 4,388,091 A | 6/1983 | Khosropour |
| 4,396,407 A | 8/1983 | Reese |
| 4,440,555 A | 4/1984 | Chichester |
| 4,460,390 A | 7/1984 | Alseth et al. |
| 4,482,365 A | 11/1984 | Roach |
| 4,482,368 A | 11/1984 | Roberts |
| 4,486,206 A | 12/1984 | Miyakawa et al. |
| 4,491,460 A | 1/1985 | Tokar |
| 4,537,160 A | 8/1985 | Shirai |
| 4,548,166 A | 10/1985 | Gest |
| 4,589,379 A | 5/1986 | Fujikawa et al. |
| 4,592,316 A | 6/1986 | Shiratsuchi et al. |
| 4,619,677 A | 10/1986 | Matheson et al. |
| 4,653,457 A | 3/1987 | Stege |
| 4,658,767 A | 4/1987 | Fujikawa et al. |
| 4,664,684 A | 5/1987 | Dunn et al. |
| 4,681,608 A | 7/1987 | Nagashima |
| 4,720,292 A | 1/1988 | Engel et al. |
| 4,758,256 A | 7/1988 | Machado |
| 4,759,783 A | 7/1988 | Machado |
| 4,783,207 A | 11/1988 | Nagashima et al. |
| 4,790,864 A | 12/1988 | Kostun |
| 4,806,135 A | 2/1989 | Siposs |
| 4,813,385 A | 3/1989 | Yamaguchi et al. |
| 4,838,901 A | 6/1989 | Schmidt et al. |
| RE33,085 E | 10/1989 | Petersen |
| 4,871,381 A | 10/1989 | Smith |
| 4,897,097 A | 1/1990 | Yamamura |
| 4,946,482 A | 8/1990 | Tamba et al. |
| 4,950,317 A | 8/1990 | Dottermans |
| 4,969,937 A | 11/1990 | Tassicker |
| 5,013,182 A | 5/1991 | Coulvonaux et al. |
| 5,022,903 A | 6/1991 | Decker |
| 5,030,264 A | 7/1991 | Klotz et al. |
| 5,059,221 A | 10/1991 | McWilliam |
| 5,082,476 A | 1/1992 | Kahlbaugh et al. |
| 5,106,397 A | 4/1992 | Jaroszczyk et al. |
| RE33,978 E | 6/1992 | Shirai |
| 5,120,334 A | 6/1992 | Cooper |
| 5,120,337 A | 6/1992 | Benzler et al. |
| 5,125,940 A | 6/1992 | Stanhope et al. |
| 5,137,557 A | 8/1992 | Behrendt et al. |
| 5,160,519 A | 11/1992 | Svensson et al. |
| 5,167,683 A | 12/1992 | Behrendt et al. |
| 5,171,342 A | 12/1992 | Trefz |
| 5,197,282 A | 3/1993 | Kume |
| 5,213,596 A | 5/1993 | Kume et al. |
| 5,277,157 A | 1/1994 | Teich |
| 5,317,997 A | 6/1994 | Tomitaku |
| 5,343,831 A | 9/1994 | Collins |
| 5,352,256 A | 10/1994 | Stead et al. |
| 5,367,988 A | 11/1994 | Collins |
| 5,377,632 A | 1/1995 | Aronsson et al. |
| 5,408,977 A | 4/1995 | Cotton |
| 5,449,391 A | 9/1995 | Decker |
| 5,472,463 A | 12/1995 | Herman et al. |
| 5,472,464 A | 12/1995 | Mochida |
| 5,477,819 A | 12/1995 | Kopec |
| 5,494,497 A | 2/1996 | Lee |
| 5,505,756 A | 4/1996 | Decker |
| 5,542,380 A | 8/1996 | Chatten |
| 5,545,241 A | 8/1996 | Vanderanuwera et al. |
| 5,547,480 A | 8/1996 | Coulonvaux |
| 5,553,587 A | 9/1996 | Conoscenti |
| 5,556,440 A | 9/1996 | Mullins et al. |
| 5,575,247 A | 11/1996 | Nakayama et al. |
| 5,609,658 A | 3/1997 | Takemura et al. |
| 5,622,537 A | 4/1997 | Kahlbaugh et al. |
| 5,632,243 A | 5/1997 | Bucholz |
| 5,634,339 A | 6/1997 | Lewis et al. |
| 5,651,339 A | 7/1997 | Weining et al. |
| 5,674,603 A | 10/1997 | Stiles et al. |
| 5,713,323 A | 2/1998 | Walsh et al. |
| 5,725,624 A | 3/1998 | Ernst et al. |
| 5,730,769 A | 3/1998 | Dungs et al. |
| 5,755,095 A | 5/1998 | Maurer |
| 5,755,842 A | 5/1998 | Patel et al. |
| 5,755,843 A | 5/1998 | Sundquist |
| 5,769,045 A | 6/1998 | Edwards et al. |
| 5,779,900 A | 7/1998 | Holm et al. |
| 5,800,581 A | 9/1998 | Gielink et al. |
| 5,813,384 A | 9/1998 | Lavender et al. |
| D401,306 S | 11/1998 | Ward et al. |
| 5,858,224 A | 1/1999 | Schwandt et al. |
| 5,863,313 A | 1/1999 | Coulonvaux |
| 5,865,863 A | 2/1999 | DeSousa et al. |
| D407,475 S | 3/1999 | Coulonvaux et al. |
| 5,882,367 A | 3/1999 | Morgan et al. |
| 5,893,937 A | 4/1999 | Moessinger |
| 5,897,676 A | 4/1999 | Engel et al. |
| 5,918,576 A | 7/1999 | Ohoka et al. |
| 5,921,214 A | 7/1999 | Fujita et al. |
| D412,567 S | 8/1999 | Ward et al. |
| 5,935,281 A | 8/1999 | Rotheiser et al. |
| 5,951,729 A | 9/1999 | Ernst et al. |
| 5,954,577 A | 9/1999 | Meckler |
| D416,317 S | 11/1999 | Bellil et al. |
| 5,980,618 A | 11/1999 | Holzmann et al. |

(56) References Cited

U.S. PATENT DOCUMENTS

| | | | |
|---|---|---|---|
| 5,983,632 | A | 11/1999 | Fujita et al. |
| D421,110 | S | 2/2000 | Coulonvaux et al. |
| 6,022,055 | A | 2/2000 | Coulonvaux et al. |
| 6,026,768 | A | 2/2000 | Spitler et al. |
| D422,069 | S | 3/2000 | Decker |
| 6,039,777 | A | 3/2000 | Lee |
| 6,039,778 | A | 3/2000 | Coulonvaux |
| 6,044,811 | A | 4/2000 | Kouchi et al. |
| 6,051,042 | A | 4/2000 | Coulonvaux |
| 6,071,370 | A | 6/2000 | Stiles |
| 6,085,915 | A | 7/2000 | Schwandt et al. |
| 6,096,108 | A | 8/2000 | Coulonvaux et al. |
| 6,098,586 | A | 8/2000 | Bloomer |
| 6,139,607 | A | 10/2000 | Coulonvaux |
| 6,149,700 | A | 11/2000 | Morgan et al. |
| 6,167,862 | B1 | 1/2001 | Powell et al. |
| 6,171,355 | B1 | 1/2001 | Gieseke et al. |
| 6,179,890 | B1 | 1/2001 | Ramos et al. |
| 6,183,544 | B1 | 2/2001 | Ormond et al. |
| 6,187,073 | B1 | 2/2001 | Gieseke et al. |
| 6,196,203 | B1 | 3/2001 | Grieve et al. |
| D440,645 | S | 4/2001 | Coulonvaux et al. |
| 6,216,453 | B1 | 4/2001 | Maurer |
| 6,217,627 | B1 | 4/2001 | Vyskocil et al. |
| 6,220,020 | B1 | 4/2001 | Takahashi et al. |
| 6,231,630 | B1 | 5/2001 | Ernst et al. |
| 6,234,132 | B1 | 5/2001 | Kopec et al. |
| 6,235,073 | B1 | 5/2001 | Bannister et al. |
| 6,251,150 | B1 | 6/2001 | Small et al. |
| 6,251,151 | B1 | 6/2001 | Kobayashi et al. |
| 6,261,334 | B1 | 7/2001 | Morgan et al. |
| 6,264,712 | B1 | 7/2001 | Decker |
| 6,286,471 | B1 | 9/2001 | Powell |
| 6,290,739 | B1 | 9/2001 | Gieseke et al. |
| 6,306,192 | B1 | 10/2001 | Greif et al. |
| 6,306,193 | B1 | 10/2001 | Morgan et al. |
| 6,311,483 | B1 | 11/2001 | Hori et al. |
| 6,312,491 | B2 | 11/2001 | Coulonvaux |
| 6,314,922 | B1 | 11/2001 | Zimmerman et al. |
| 6,319,304 | B1 | 11/2001 | Moredock |
| 6,334,887 | B1 | 1/2002 | Coulonvaux |
| 6,340,011 | B1 | 1/2002 | Jainek |
| 6,340,375 | B1 | 1/2002 | DePietro, III et al. |
| 6,355,077 | B1 | 3/2002 | Chittenden et al. |
| 6,361,574 | B1 | 3/2002 | Decker |
| 6,361,590 | B1 | 3/2002 | Gilbert, Jr. et al. |
| 6,383,243 | B1 | 5/2002 | Yoder |
| 6,383,244 | B1 | 5/2002 | Wake et al. |
| 6,391,076 | B1 | 5/2002 | Jaroszczyk et al. |
| 6,395,048 | B1 | 5/2002 | Yoder et al. |
| 6,398,832 | B2 | 6/2002 | Morgan et al. |
| 6,401,961 | B1 | 6/2002 | Butler |
| 6,402,798 | B1 | 6/2002 | Kallsen et al. |
| 6,409,786 | B1 | 6/2002 | Wright et al. |
| 6,413,289 | B2 | 7/2002 | Engel et al. |
| 6,416,561 | B1 | 7/2002 | Kallsen et al. |
| 6,416,563 | B1 | 7/2002 | Wright et al. |
| 6,419,718 | B1 | 7/2002 | Klug et al. |
| 6,425,930 | B1 | 7/2002 | Wake et al. |
| 6,425,943 | B1 | 7/2002 | Moredock |
| 6,427,364 | B1 | 8/2002 | Heismann et al. |
| 6,436,162 | B1 | 8/2002 | Wake et al. |
| 6,474,284 | B1 | 11/2002 | Baumann et al. |
| D467,654 | S | 12/2002 | Klug et al. |
| 6,494,180 | B1 | 12/2002 | Schlossarczyk |
| 6,517,595 | B2 | 2/2003 | Kino et al. |
| 6,540,801 | B2 | 4/2003 | Gieseke et al. |
| 6,547,857 | B2 | 4/2003 | Gieseke et al. |
| 6,564,766 | B2 | 5/2003 | Ayton |
| 6,592,655 | B2 | 7/2003 | Iriyama et al. |
| 6,599,342 | B2 | 7/2003 | Andress et al. |
| 6,602,308 | B1 | 8/2003 | Carle et al. |
| 6,610,117 | B2 | 8/2003 | Gieseke et al. |
| 6,638,332 | B1 | 10/2003 | Schmitz et al. |
| 6,641,636 | B2 | 11/2003 | Willig et al. |
| 6,641,637 | B2 | 11/2003 | Kallsen et al. |
| 6,663,685 | B2 | 12/2003 | Wright et al. |
| 6,673,136 | B2 | 1/2004 | Gillingham et al. |
| 6,681,726 | B2 | 1/2004 | Linsbauer et al. |
| 6,691,662 | B2 | 2/2004 | Pontoppidan |
| 6,726,742 | B2 | 4/2004 | Arden et al. |
| D492,759 | S | 7/2004 | Yoshida |
| 6,758,186 | B2 | 7/2004 | Janoske |
| 6,789,385 | B2 | 9/2004 | Glover |
| 6,792,925 | B2 | 9/2004 | Dworatzek et al. |
| 6,805,088 | B2 | 10/2004 | Tachibana et al. |
| 6,814,772 | B1 | 11/2004 | Wake et al. |
| 6,829,804 | B2 | 12/2004 | Sepke |
| 6,852,148 | B2 | 2/2005 | Gieseke et al. |
| 6,857,399 | B2 | 2/2005 | Davis et al. |
| 6,862,885 | B1 | 3/2005 | Mitchell |
| 6,878,189 | B2 | 4/2005 | Moredock |
| 6,890,375 | B2 | 5/2005 | Huber |
| 6,991,664 | B2 | 1/2006 | Richmann et al. |
| 7,004,987 | B2 | 2/2006 | Pikesh et al. |
| 7,028,463 | B2 | 4/2006 | Hammond et al. |
| D520,619 | S | 5/2006 | Kuempel et al. |
| 7,077,078 | B2 | 7/2006 | Yuasa et al. |
| 7,080,621 | B2 | 7/2006 | Nakamizo et al. |
| 7,141,101 | B2 | 11/2006 | Amann |
| 7,150,485 | B2 | 12/2006 | Wirges et al. |
| 7,159,577 | B2 | 1/2007 | Haskew et al. |
| 7,165,536 | B2 | 1/2007 | Kirk et al. |
| 7,182,804 | B2 | 2/2007 | Gieseke et al. |
| D540,819 | S | 4/2007 | Schmitt et al. |
| D540,929 | S | 4/2007 | Kowis et al. |
| 7,197,869 | B2 | 4/2007 | Kokubo et al. |
| 7,201,155 | B2 | 4/2007 | Mills |
| 7,213,581 | B2 | 5/2007 | Burke et al. |
| 7,267,112 | B2 | 9/2007 | Donahue et al. |
| D555,775 | S | 11/2007 | Bonde et al. |
| 7,290,533 | B2 | 11/2007 | Tsuruta et al. |
| 7,364,601 | B2 | 4/2008 | Xu et al. |
| 7,392,770 | B2 | 7/2008 | Xiao |
| 7,438,059 | B2 | 10/2008 | Mills et al. |
| 7,516,611 | B2 | 4/2009 | Wassmur et al. |
| 7,544,224 | B2 * | 6/2009 | Tanner et al. .................. 55/337 |
| 7,594,484 | B2 | 9/2009 | Lavender et al. |
| 7,662,199 | B2 | 2/2010 | Wellens et al. |
| 7,740,678 | B2 | 6/2010 | Gunderson et al. |
| 7,914,609 | B2 | 3/2011 | Sullivan et al. |
| 8,052,780 | B2 | 11/2011 | Rotter et al. |
| 8,083,822 | B2 | 12/2011 | Hoffman et al. |
| 8,241,378 | B2 | 8/2012 | Sullivan et al. |
| 2002/0189573 | A1 | 12/2002 | Janoske |
| 2003/0217534 | A1 | 11/2003 | Krisko et al. |
| 2004/0006955 | A1 | 1/2004 | Engel et al. |
| 2004/0083692 | A1 | 5/2004 | Dworatzek et al. |
| 2004/0094114 | A1 | 5/2004 | Riehmann et al. |
| 2004/0134171 | A1 | 7/2004 | Scott et al. |
| 2007/0000134 | A1 | 1/2007 | Uhl et al. |
| 2007/0079794 | A1 | 4/2007 | Rotter et al. |
| 2007/0240404 | A1 | 10/2007 | Pekrul et al. |
| 2009/0308250 | A1 | 12/2009 | Rotter et al. |
| 2011/0011042 | A1 | 1/2011 | Gillingham et al. |
| 2011/0120310 | A1 | 5/2011 | Sullivan et al. |
| 2012/0042847 | A1 | 2/2012 | Rotter et al. |
| 2012/0073539 | A1 | 3/2012 | Lee |

FOREIGN PATENT DOCUMENTS

| | | |
|---|---|---|
| DE | 4319503 | 1/1994 |
| DE | 19531504 | 2/1997 |
| DE | 10128790 | 12/2002 |
| DE | 202007005384 | 8/2008 |
| EP | 0 197 692 A1 | 10/1986 |
| EP | 0 568 560 A1 | 11/1993 |
| EP | 0 753 657 A1 | 1/1997 |
| EP | 0 900 115 A1 | 3/1999 |
| EP | 0 969 911 A1 | 1/2000 |
| EP | 1 070 841 A2 | 1/2001 |
| EP | 1 364 696 | 11/2003 |
| EP | 1 364 696 A1 | 11/2003 |
| EP | 1 701 030 | 9/2006 |

(56) References Cited

FOREIGN PATENT DOCUMENTS

| | | |
|---|---|---|
| EP | 1 767 756 A1 | 3/2007 |
| FR | 2771772 | 6/1999 |
| GB | 568 038 A | 3/1945 |
| GB | 909 891 A | 11/1962 |
| GB | 1 150 896 A | 5/1969 |
| GB | 1 304 182 | 1/1973 |
| GB | 1 582 968 A | 1/1981 |
| GB | 2 064 359 A | 6/1981 |
| GB | 2 172 814 A | 10/1986 |
| GB | 2 376 650 A | 12/2002 |
| GB | 2 393 760 A | 4/2004 |
| JP | 54 67824 A | 5/1979 |
| JP | 54 151725 A | 11/1979 |
| JP | 56 96147 A | 8/1981 |
| JP | 56 113039 A | 9/1981 |
| JP | 56 151255 A | 11/1981 |
| JP | 56 165757 A | 12/1981 |
| JP | 58 77156 A | 5/1983 |
| JP | 59 150961 A | 8/1984 |
| JP | 60 243361 A | 12/1985 |
| JP | 62 126264 A | 6/1987 |
| JP | 62 197623 A | 9/1987 |
| JP | 63 41655 A | 2/1988 |
| JP | 63253167 | 10/1988 |
| JP | 1 106971 A | 4/1989 |
| JP | 1 147154 A | 6/1989 |
| JP | 2 45647 A | 2/1990 |
| JP | 2 197483 A | 8/1990 |
| JP | 2 227546 A | 9/1990 |
| JP | 3 222813 A | 10/1991 |
| JP | 4 347357 A | 12/1992 |
| JP | 659098 | 8/1994 |
| JP | 6 346733 A | 12/1994 |
| JP | 7 19038 A | 1/1995 |
| JP | 7 127531 A | 5/1995 |
| JP | 8 232654 A | 9/1996 |
| JP | 8 232786 A | 9/1996 |
| JP | 9 88738 | 3/1997 |
| JP | 9168711 | 6/1997 |
| JP | 2000 303835 | 10/2000 |
| JP | 2001 200768 | 7/2001 |
| JP | 2002 284072 | 10/2002 |
| JP | 2004 225550 | 8/2004 |
| JP | 2006 220002 | 8/2006 |
| JP | 2006 281950 | 10/2006 |
| JP | 2007 62643 | 3/2007 |
| JP | 2007 113404 | 5/2007 |
| JP | 2007 133404 | 5/2007 |
| KR | 2001 01 08884 | 12/2001 |
| WO | 97 41345 | 11/1997 |
| WO | 98 36162 | 8/1998 |
| WO | 98 49440 | 11/1998 |
| WO | 00 74818 | 12/2000 |
| WO | 01 70374 | 9/2001 |
| WO | 02 31340 | 4/2002 |
| WO | 0231341 | 4/2002 |
| WO | 2005 075805 | 8/2005 |
| WO | 2006 002798 | 1/2006 |
| WO | 2006 044893 | 4/2006 |
| WO | 2007 047433 | 4/2007 |
| WO | 2008 063106 | 5/2008 |

OTHER PUBLICATIONS

Chinese Patent Application No. 200980104257.9; Second Office Action, Nov. 14, 2012: 6 pages.
European Patent Application No. 09762847.3; Office Communication; Feb. 23, 2011: 2 pages.
European Patent Application No. 09762847.3; Office Communication; Jun. 9, 2011; 3 pages.
European Patent Application No. 09762847.3; Office Communication; Aug. 5, 2011: 3 pages.
Chinese Patent Application No. 200980104257.9: Office Communication: issued Mar. 5, 2013; 15 pages.
Chinese Patent Application No. 200980104257.9, fourth office action, dated Feb. 7, 2014, 18 pages.
EP 10 004 603.6, Search Opinion and Report; Jul. 12, 2010 (5 pages).
EP 10 004 604.4, Search Opinion and Report, Jul. 14, 2010 (4 pages).
http://www.cumminsfiltration.com/pdfs/product_lit/americas_brochures/air_housings.pdf; on or before Feb. 23, 2007, Fleetguard Filter Housings on pp. E111 & E112 (19 pages).
http://www.cumminsfiltration.com/pdfs/product_lit/americas_brochures/LT32599_s4.pdf; on or before Feb. 23, 2007, Fleetguard Filter Housing on p. 95 and OptiAir Filters on pp. 101-126 (98 total pages).
http://www.comminsfiltration.com/pdfs/product_lit/americas_brochures/LT32624.pdf; 2005, OptiAir Filter System (4 pages).
Fleetguard Air Cleaners; Nelson—Fleetguard 1-3, Nelson Assembly 1 & 2; Competitor Air Cleaner Assemblies; on or before Oct. 12, 2005 (5 pages).
Fleetguard®, Optiair Technical Bulletin, Air Cleaner Data Sheet and Performance Curve, © Fleetguard 2005, TB08/04 Rev 1, printed in the U.S.A., available at www.fleetguard.com (2 pages).
Fleetguard®, OptiAir—The Next Generation in Air Intake Design; available at http://www.cumminsfiltration.com/pdfs/product_lit/americas_brochures/LT32624.pdf, 2007 Rev. 2, 2007 (4 pages).
Mahle, Driven by Performance, available at http://www.mahle.com/C1256F7900537A47/vwContentByKey/W26QPJLS933STULEN/$FILE/Filterprogramm_en.pdf, Jun. 2006 (20 pages).
Mann+Hummel's High Performance Air Cleaner Gives the Mercury Marauder a Boost in Performance; Advanced Materials & Composites News; May 20, 2002; available at http://dialogpro.dialog.com (2 pages).
Mann+Hummel Air Cleaners, available at http://www.mann-hummel.com?industrialfilters/upload/doc/HBSKOJhyaql.pdf; includes a section on Europiclon filters, Jun. 2005 (142 pages).
PCT International Search Report, relating to International Application No. PCT/US2006/040081; date of mailing May 2, 2007 (5 pages).
PCT Written Opinion of the International Searching Authority, relating to International Application No. PCT/US2009/003371; date of mailing Nov. 23, 2009 (6 pages).
EP Application No. 06825905.0-2311; EP Office Action dated Aug. 5, 2008 and Applicant Amendment dated May 14, 2009; 10 pages.
Australian Patent Application No. 2006304242; Examiner's First Report; Jul. 5, 2010; 3 pages.
Chinese Patent Application No. 201110160333.7; First Office Action; Apr. 6, 2012; 18 pages.
Chinese Patent Application No. 200680037508.2; First Office Action; Apr. 30, 2010; 11 pages.
EP Patent Application No. 10 004 603.6; Extended European Search Report; Aug. 3, 2010; 6 pages.
EP Patent Application No. 10 004 604.4; Extended European Search Report; Sep. 15, 2010; 6 pages.
EP Patent Application No. 10 004 604.4; Office Communication; Jan. 19, 2012; 3 pages.
Chinese Patent Application No. 201110160333.7; Second Office Action; Feb. 1, 2013; 11 pages.
Translation of the Notification of the Fourth Office Action from Chinese State Intellectual Property Office for Application No. 200980104257.9, dated Nov. 26, 2014, 8 pages.
Fourth Office Action for Chinese Application No. 200980104257.9, dated Nov. 26, 2014, 6 pages.

* cited by examiner

CYCLONIC AIR CLEANER

CROSS REFERENCE TO RELATED APPLICATION

This application claims the benefit under 35 U.S.C. §119 (c) of U.S. Provisional Application No. 61/061,502, filed Jun. 13, 2008, the teachings and disclosures of which are incorporated herein by reference.

FIELD OF THE INVENTION

The present invention relates to internal combustion engines and, more particularly, to air cleaner devices and components employed in internal combustion engines.

BACKGROUND OF THE INVENTION

Small internal combustion engines are used in a wide variety of applications including, for example, lawn mowers, lawn tractors, snow blowers, and power machinery. Frequently, such internal combustion engines employ a device to remove contaminants from the combustion air to prevent premature wear of any internal components. Typically, the contaminants, which mainly comprise air born dirt, sand, cement dust, and chaff from vegetation, are removed from the combustion (or intake) air with a filtering device called an air cleaner. The air cleaner is generally attached upstream of the carburetor or throttle valve on spark ignited engines and upstream of the intake manifold on diesel engines for preventing abrasive particles from entering the engine's cylinders.

To effectively trap contaminants and other abrasive particulate matter, most air cleaners employ a filtering media that performs a filtering operation. Generally, the filtering operation encompasses a sieving process that traps the contaminant particles as they pass through the filtering media. With time, the filtering element, which typically has a finite capacity to trap dirt, becomes restricted as trapped particles build up on and within that filter. Furthermore, as the build up on the filter continues to increase, the air flow continuously becomes more and more restricted until the point when the engine's performance starts being affected. In addition to the continuous build up of debris on the filter, at least some severe conditions can cause the filter to reach its capacity in a short period of time, thereby requiring frequent replacement. Replacing the filter element can be both time consuming and costly for the equipment owner. Thus, it is often desired to employ devices and mechanisms that can provide effective filtering while extending the life of filter elements.

One such device is a pre-cleaning device, which is often employed in conjunction with an air cleaner device to separate out heavier dirt particles from the intake air before that air is provided to the air cleaner. By virtue of utilizing such pre-cleaning devices, the volume of dirt to be removed by the air cleaner filter is reduced. However, utilizing both pre-cleaner and air cleaner devices can significantly increase the footprint of the engine. In addition, they can be expensive devices involving a large number of components that can require considerable maintenance and frequent replacement. Also, many such conventional pre-cleaning and air cleaner devices are not well-suited for allowing efficient engine operation under varying temperature conditions. For example, pre-cleaning and air cleaner devices utilized in engines that are designed for operation under warm (e.g., summer) conditions often are incompatible with optimal operation of the engines under cold (e.g., winter) conditions.

It would therefore be advantageous if an air cleaner device that can effectively trap contaminant particles is developed. It would further be advantageous if such an air cleaner has a smaller footprint and does not require frequent replacing of the filter element. It would additionally be advantageous if such an air cleaner is cost effective to own and maintain. Also, it would be advantageous if, in at least some embodiments, the air cleaner device was compatible with engine usage under various temperatures, such as ambient temperatures, and/or other operational conditions.

SUMMARY OF THE INVENTION

In at least some embodiments, the present invention relates to an air cleaner having a housing defining a chamber therewithin, a filter element disposed within the chamber of the housing, and a duct element having a passageway in fluid communication with the chamber of the housing. Further, the duct element extends along and downwardly from about a portion of the housing and further includes an inlet for drawing intake air into the chamber. The air cleaner additionally includes a base member in fluid communication with the chamber of the housing and having an outlet, such that wherein the air drawn into the chamber of the housing is filtered by first and second filtering operations to obtain filtered air, with the first and the second filtering operations accomplished at least in part due to a cyclonic motion of the air and passage of the air through the filter element, respectively; and where the filtered air from the chamber of the housing is released through the outlet in the base member.

In at least some other embodiments, the present invention relates to a method of filtering particulate matter from intake air of an engine.

In at least some other embodiments, the present invention relates to an engine comprising an air cleaner capable of being positioned in at least one of a cool air location in which the inlet is oriented at least substantially away from the muffler and a warm air location in which the inlet is oriented at least substantially towards the muffler.

Other aspects and embodiments are contemplated and considered within the scope of the invention.

BRIEF DESCRIPTION OF THE DRAWINGS

Embodiments of the invention are disclosed with reference to the accompanying drawings and these embodiments are provided for illustrative purposes only. The invention is not limited in its application to the details of construction or the arrangement of the components illustrated in the drawings. Rather, the invention is capable of other embodiments and/or of being practiced or carried out in various other ways. The drawings illustrate a best mode presently contemplated for carrying out the invention. Like reference numerals are used to indicate like components. In the drawings.

DETAILED DESCRIPTION OF THE PREFERRED EMBODIMENT

Figure 1:
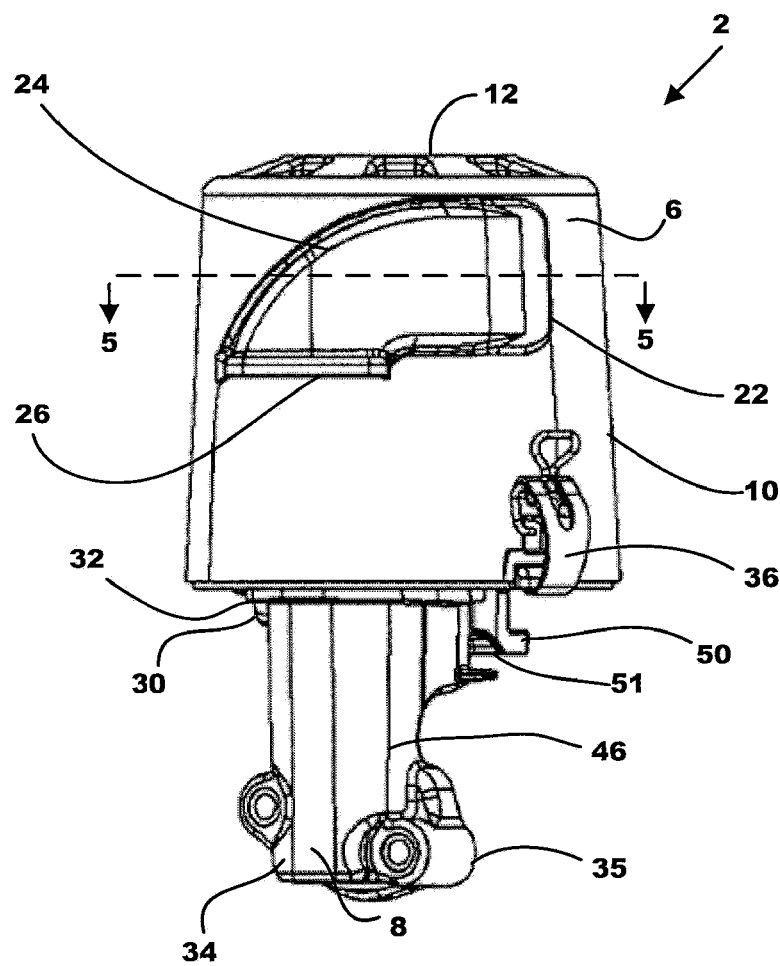
FIG. 1 is a front view of an exemplary air cleaner device employed in an internal combustion engine, in accordance with at least some embodiments of the present invention.
Figure 2:
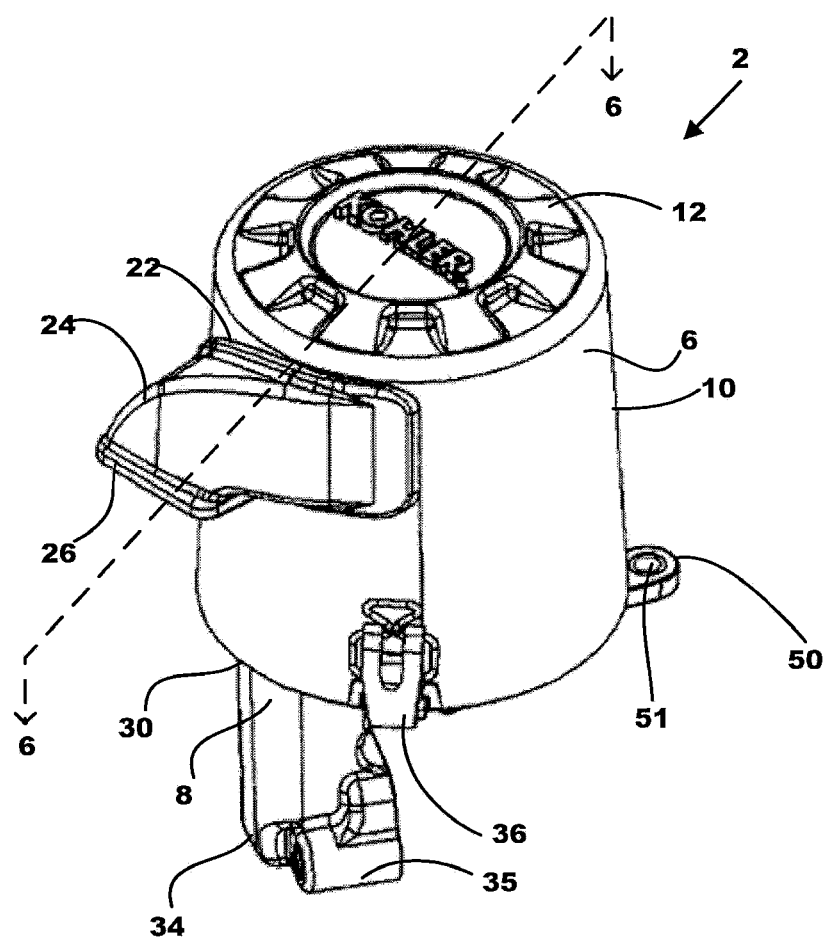
FIG. 2 is a front perspective view of the air cleaner device of FIG. 1, in accordance with at least some embodiments of the present invention.
Figure 3:
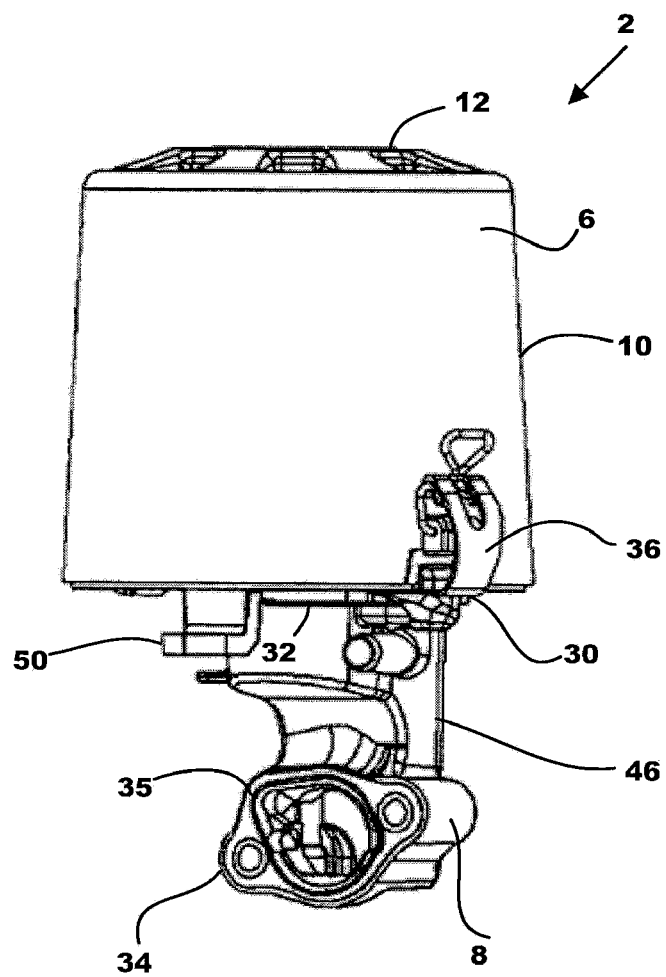
FIG. 3 is a back view of the air cleaner device of FIG. 1, in accordance with at least some embodiments of the present invention.
Figure 4:
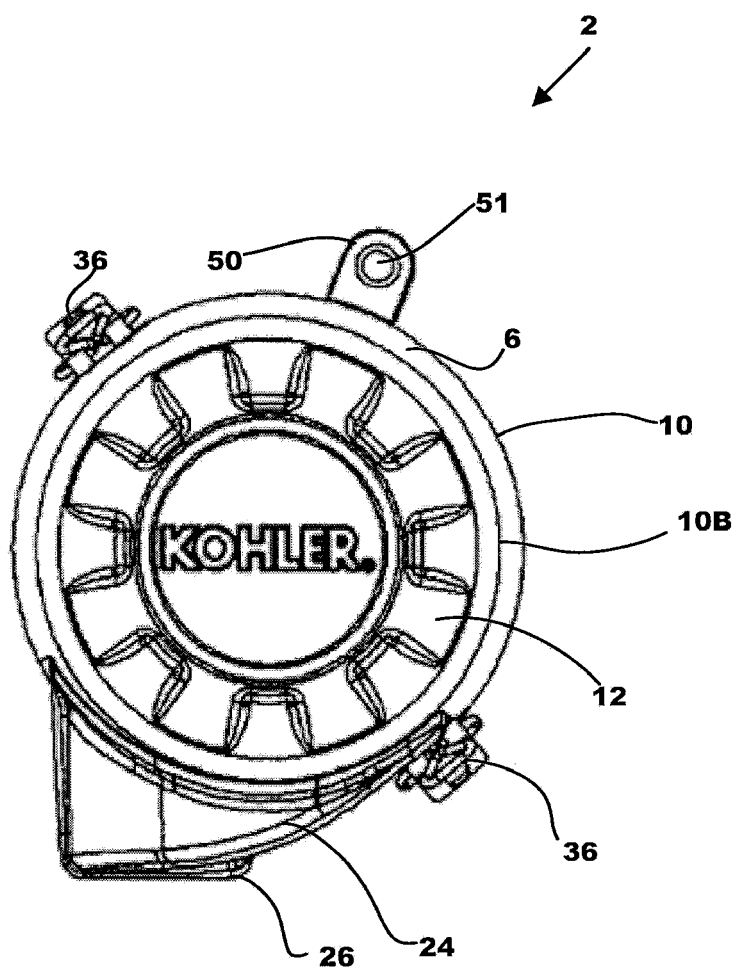
FIG. 4 is a top view of the air cleaner device of FIG. 1, in accordance with at least some embodiments of the present invention.
Figure 5:
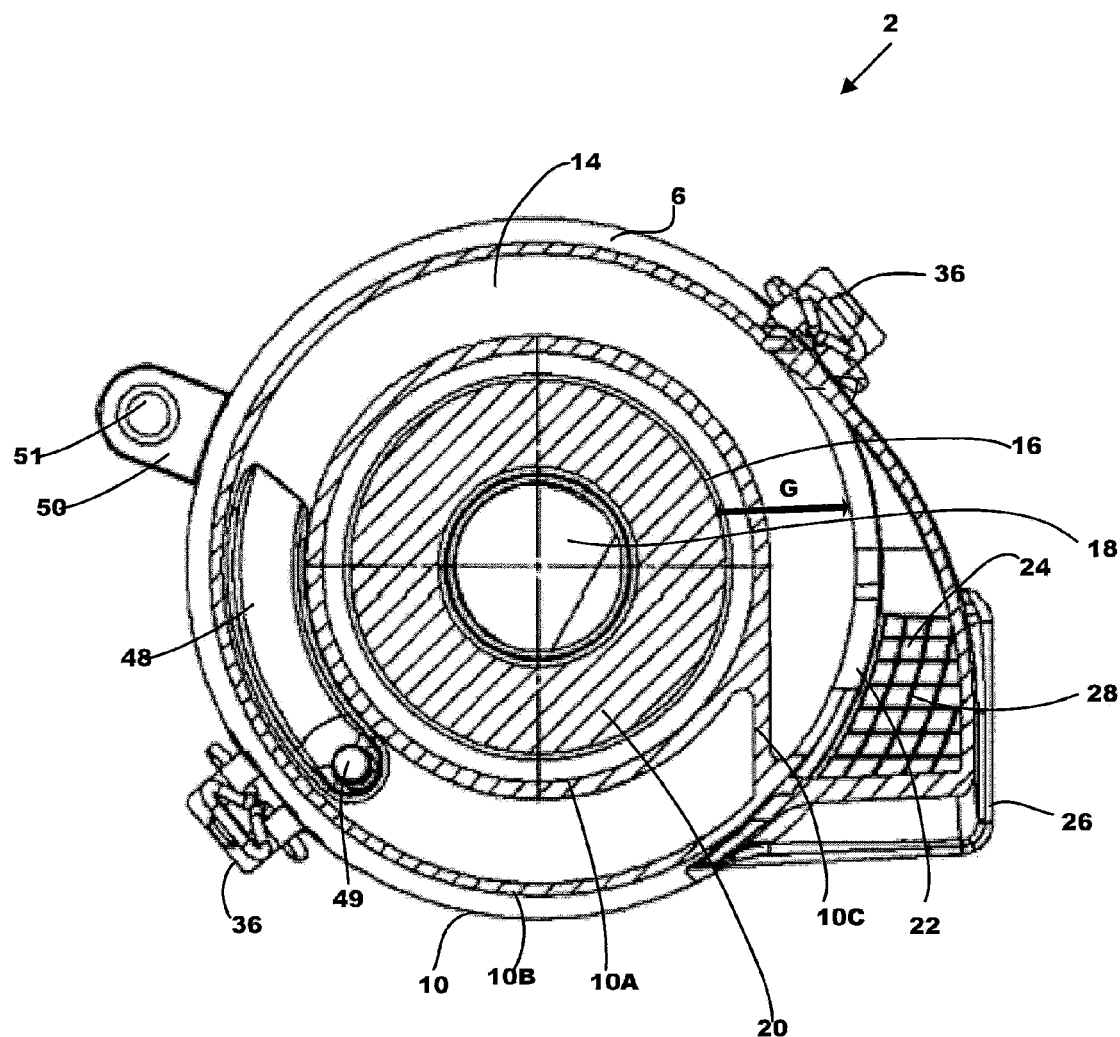
FIG. 5 is a cross-sectional view of the air cleaner device as viewed along lines 5-5 of FIG. 1 rotated 90 degrees counter clockwise, in accordance with at least some embodiments of the present invention.
Figure 6:
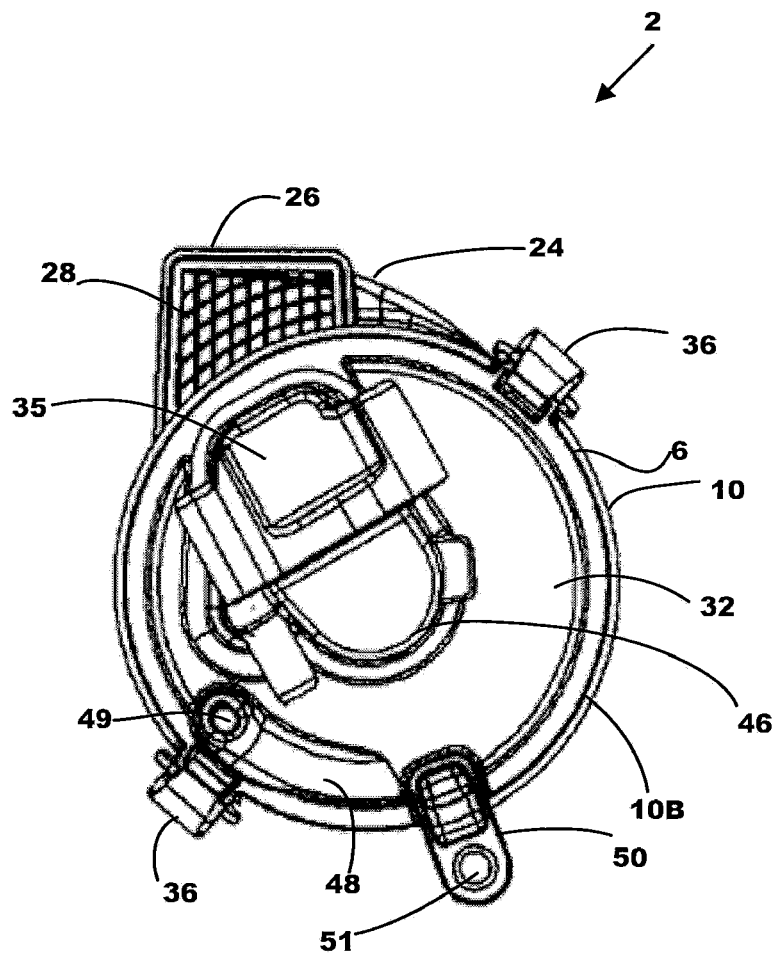
FIG. 6 is a bottom view of the air cleaner device of FIG. 1, in accordance with at least some embodiments of the present invention.
Figure 7:
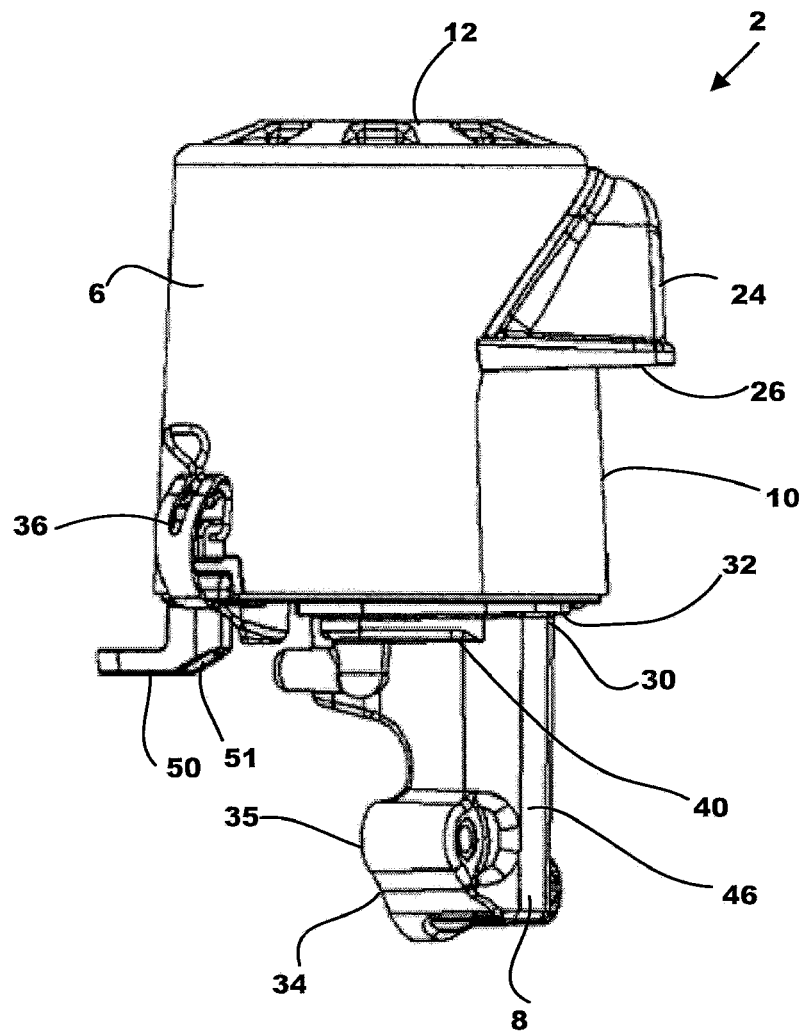
FIG. 7 is a left side view of the air cleaner device of FIG. 1, in accordance with at least some embodiments of the present invention.
Figure 8:
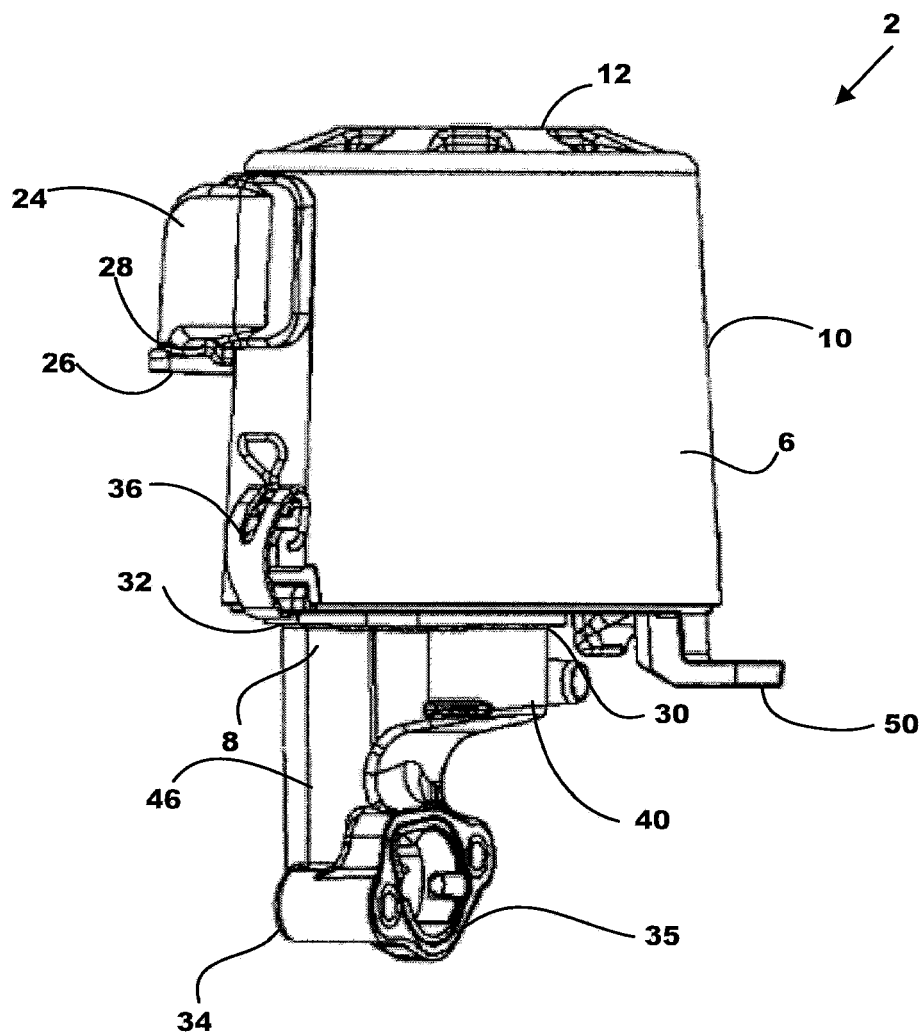
FIG. 8 is a right side view of the air cleaner device of FIG. 1, in accordance with at least some embodiments of the present invention.
Figure 9:
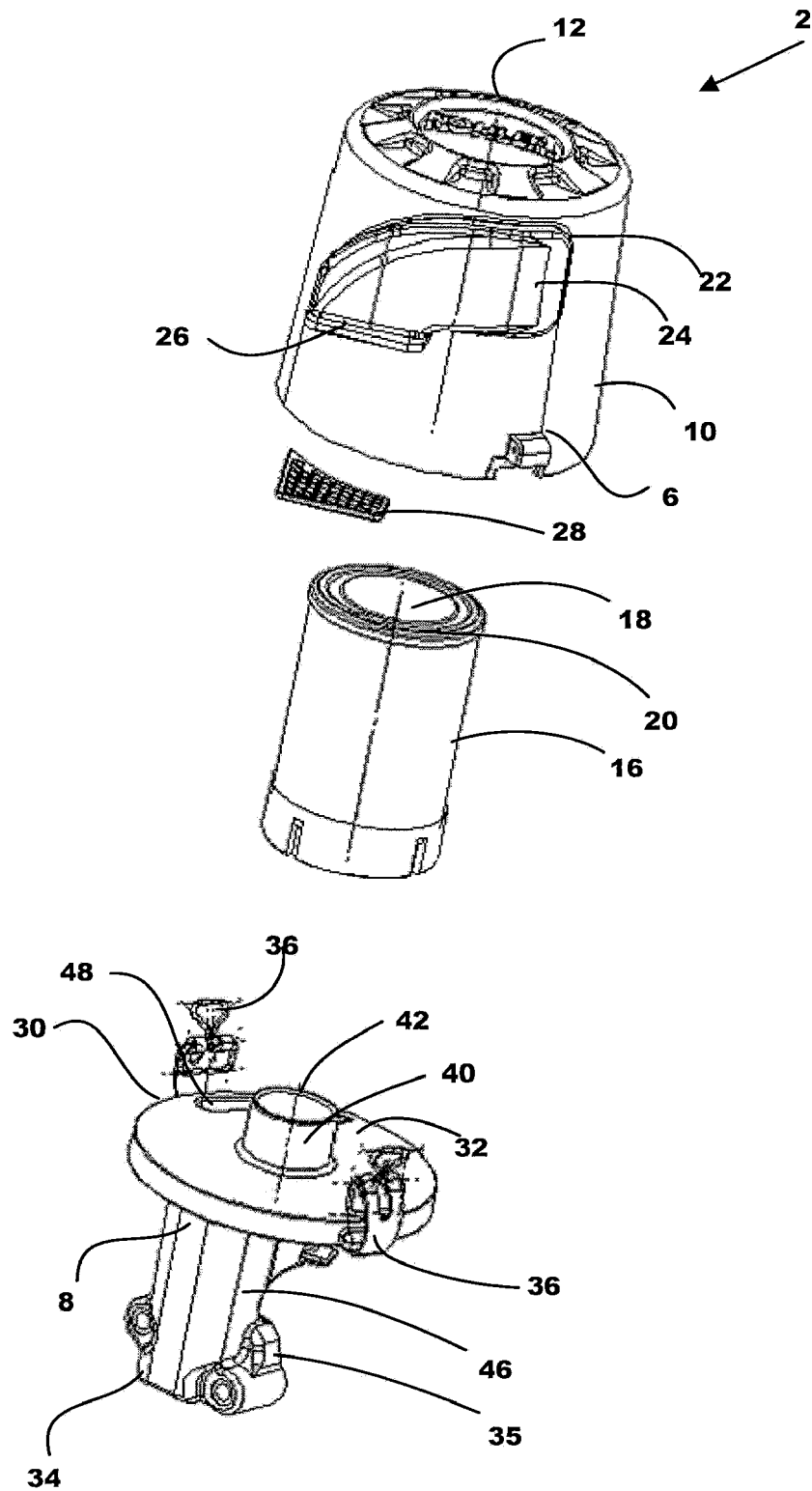
FIG. 9 is a first front perspective exploded view showing the various components of the air cleaner device of FIG. 1, in accordance with at least some embodiments of the present invention.
Figure 10:
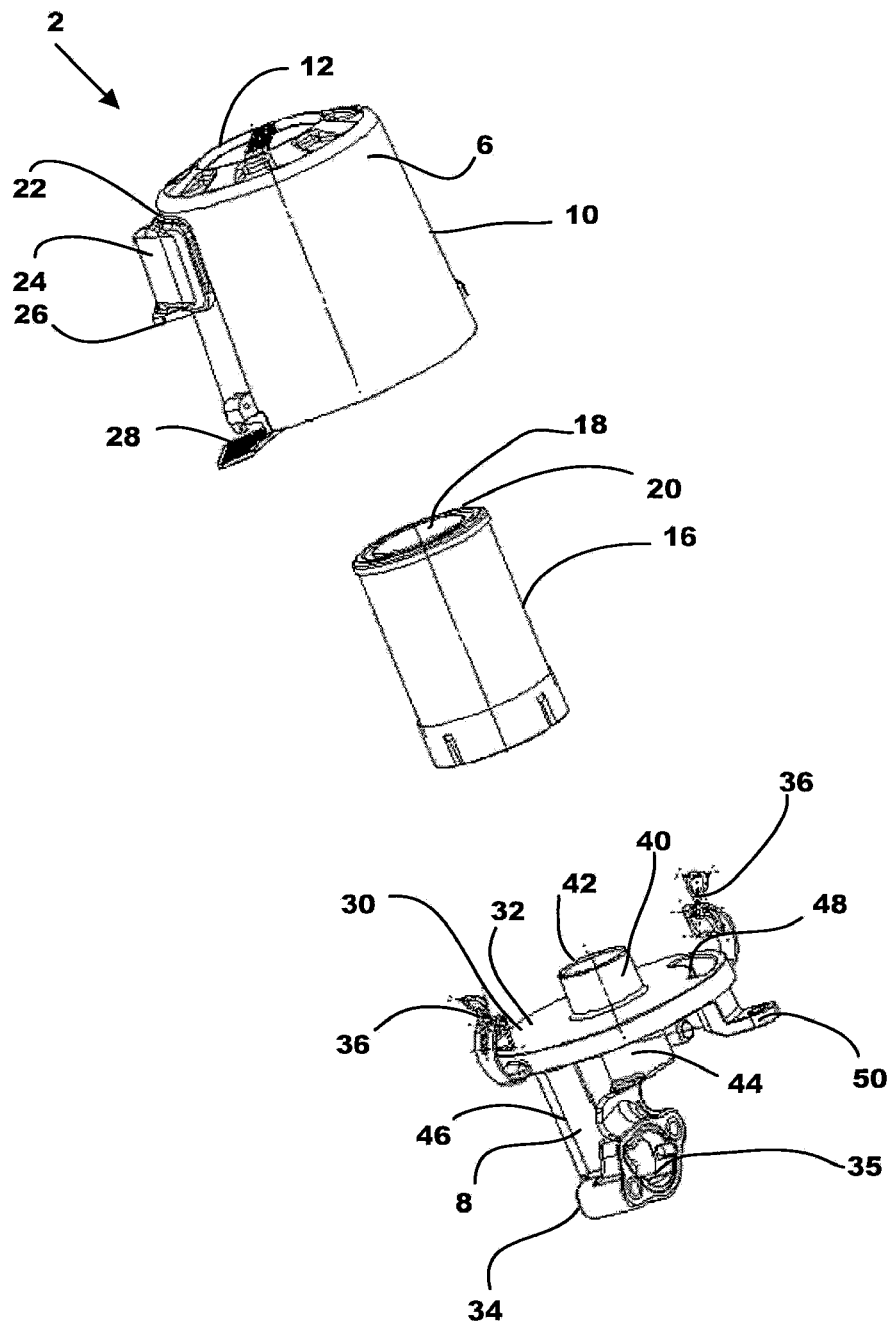
FIG. 10 is a second exploded view showing the various components of FIG. 9 rotated counter clockwise 90 degrees, in accordance with at least some embodiments of the present invention.
Figure 12:
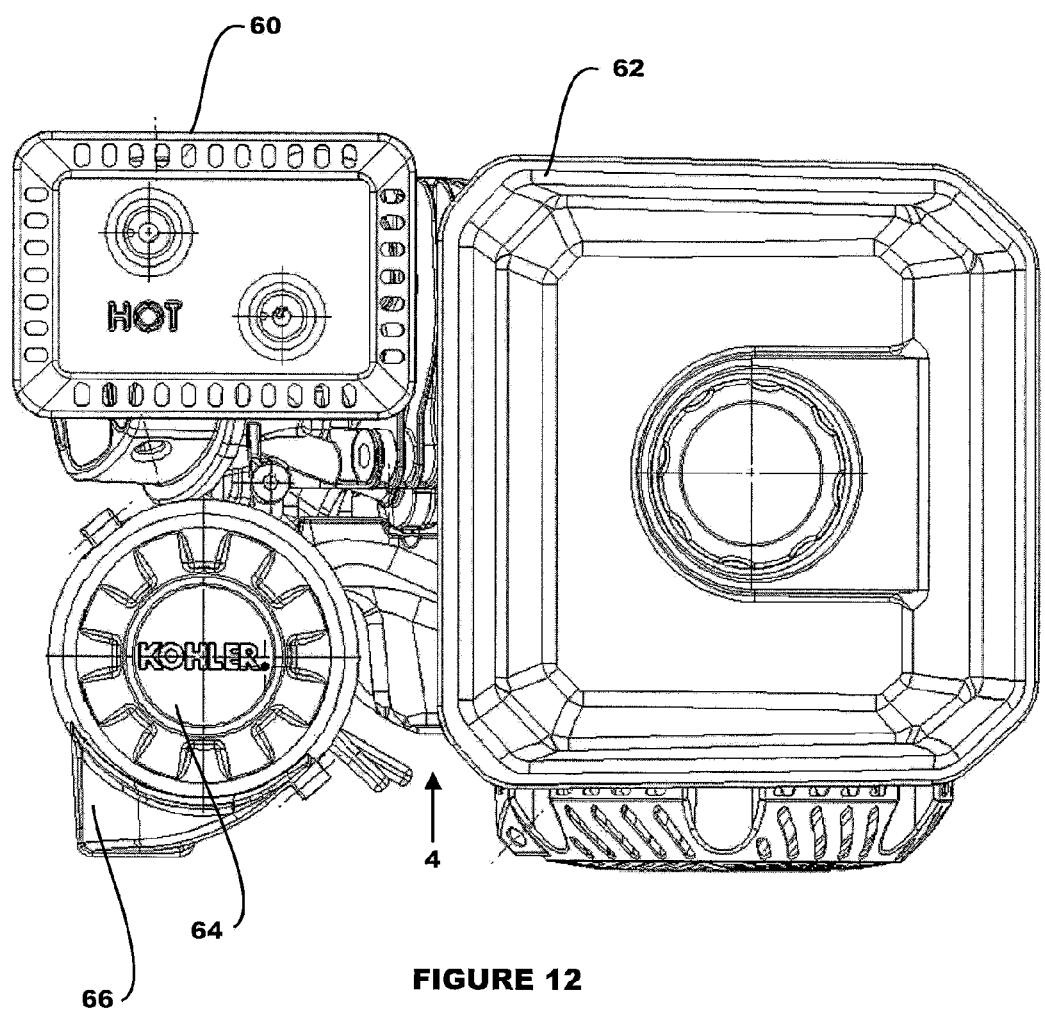
FIG. 12 shows the position of the air cleaner device within the engine in a summer configuration, in accordance with at least some embodiments of the present invention.
Figure 13:
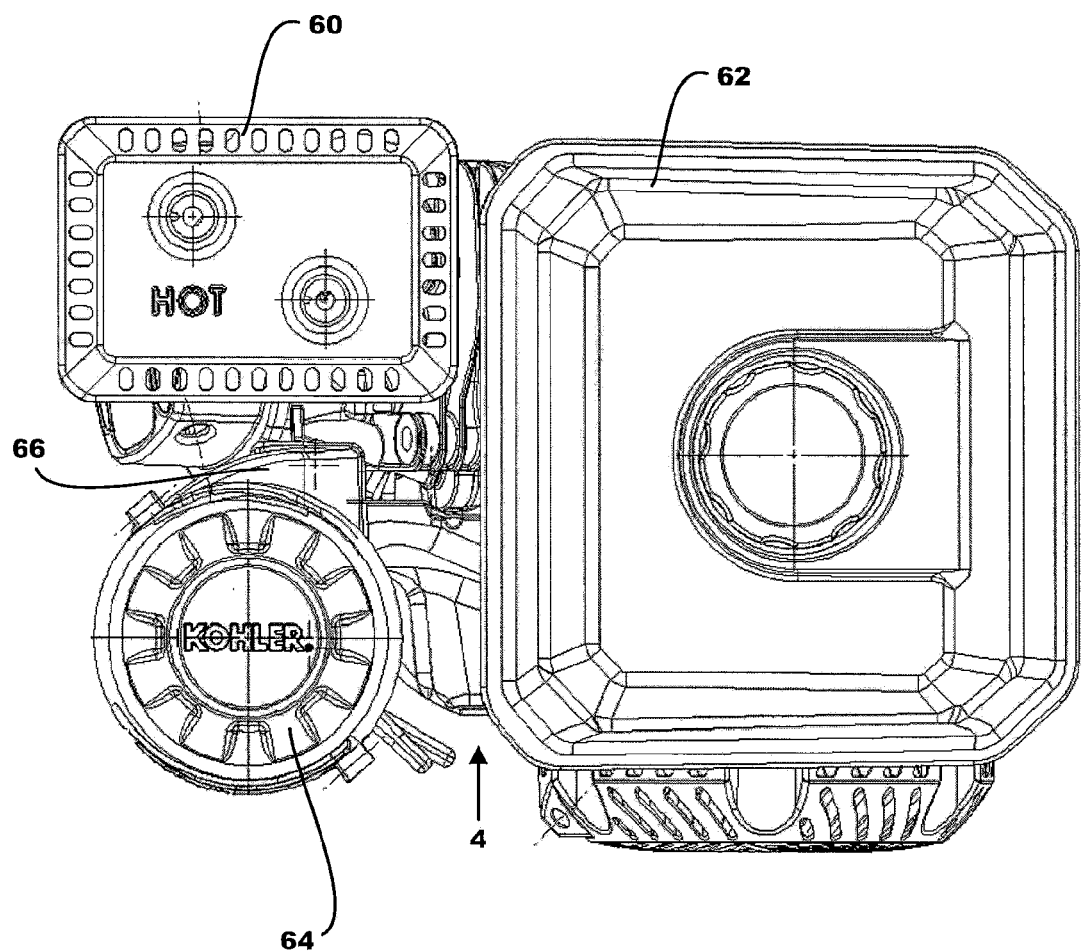
FIG. 13 shows the position of the air cleaner device within the engine in a winter configuration, in accordance with at least some other embodiments of the present invention.

Referring to FIGS. 1-10, various views of an air cleaner device 2 are shown, in accordance with at least some embodiments of the present invention. In particular, FIG. 1 shows a front view of the various components of the air cleaner device 2, while FIGS. 2 and 3 show front perspective and back views, respectively, thereof. Relatedly, FIGS. 4 and 5 show respective top and cross-sectional views of the air cleaner device 2. Additionally, FIGS. 6-8 show respective bottom, left side and right side views of the air cleaner device 2, while FIGS. 9 and 10 show exploded views of the air cleaner device 2, in accordance with at least some embodiments of the present invention The air cleaner device 2 is contemplated for use in, as part of, in conjunction or combination with, a wide variety of engines 4 (See. FIGS. 12 and 13). For example, some embodiments of the present invention can be employed in conjunction with SORE engines including Class 1 and Class 2 small off-road engines such as those implemented in various machinery and vehicles, including, for example, lawn movers, air compressors, and the like. Indeed, in at least some such embodiments, the present invention is intended to be applicable to "non-road engines" as defined in 40 C.F.R. §90.3, which states in pertinent part as follows: "Non-road engine means . . . any internal combustion engine: (i) in or on a piece of equipment that is self-propelled or serves a dual purpose by both propelling itself and performing another function (such as garden tractors, off-highway mobile cranes, and bulldozers); or (ii) in or on a piece of equipment that is intended to be propelled while performing its function (such as lawnmowers and string trimmers); or (iii) that, by itself or in or on a piece of equipment, is portable or transportable, meaning designed to be and capable of being carried or moved from one location to another. Indicia of transportability include, but are not limited to, wheels, skids, carrying handles, dolly, trailer, or platform."

Referring generally to FIGS. 1-10 and particularly to FIGS. 2 and 5, the air cleaner device 2 includes a housing 6 releasably secured to a base 8. In at least some embodiments, and as shown, the housing 6 includes a housing main portion 10 having an inner wall portion 10A that is cylindrical (or substantially cylindrical) in shape and an outer wall portion 10B that is frusto-conical (or substantially frusto-conical) in shape. The inner wall portion 10A and the outer wall portion 10B are connected, at least in part, by way of a flange portion 10C (described in greater detail below). Notwithstanding the fact that in the present embodiment, the main portion 10 of the housing 6 includes inner cylindrical and outer frusto-conical wall portions 10A and 10B, respectively, in alternate embodiments, other shapes of those portions are contemplated and considered within the scope of the present invention. For example, both portions can either be frusto-conical or cylindrical in shape.

In addition to the main portion 10, the housing 6 includes a cover housing portion 12 overlying the housing. The cover housing portion 12 can either be releasably connected to the main portion 10 of the housing 6 or be integrally formed therewith. In the embodiments in which the cover housing portion 12 is releasably connected to the main portion 10 of the housing 6, any of a wide variety of mechanisms including, for example, various types of screws, nuts, bolts and other fastening and/or engaging mechanisms and/or snap/friction fit can be employed. The cover housing portion 12 is typically, although not necessarily, shaped and sized to conform to the shape and size of the main portion 10 of the housing 6. For example, in at least some embodiments in which the main portion 10 of the housing 6 has a frusto-conical (or cylindrical) profile, the cover housing portion 12 can be circular in shape having a diameter conforming to the diameter of the outer wall portion 10A (or the inner wall portion 10B) of the housing. In other embodiments, other shapes and corresponding appropriate sizes for the housing 6 and the cover housing portion 12 are contemplated and considered within the scope of the invention.

Still referring generally to FIGS. 1-10 and particularly to FIG. 5, disposed axially within a central or substantially central portion of an interior chamber 14 of the main portion 10 of the housing 6 is a filter element 16 for filtering air entering the air cleaner device 2. Typically, any of a wide variety of filter elements 16 that are commonly available and frequently employed can be used for filtering, depending particularly upon the level of cleaning required (e.g., granularity of the material to be removed). For example, in at least some embodiments, a paper filter element (e.g., a pleated paper filter element) and, more particularly, a dry paper filter element sized appropriately for air-flow patterns of a specific application can be employed. In at least some other embodiments, filters such as, oil-wetted filters, cotton gauze filters and oil bath filters can be employed. In at least some alternate embodiments, other types of filters can be used as well. Additionally, in some embodiments, the filter element 16 can be shaped to conform to the shape of the housing 6 and sized to fit within the interior chamber 14 of the housing. In at least some other embodiments, the filter element 16 can vary in shape as well.

Figure 11:
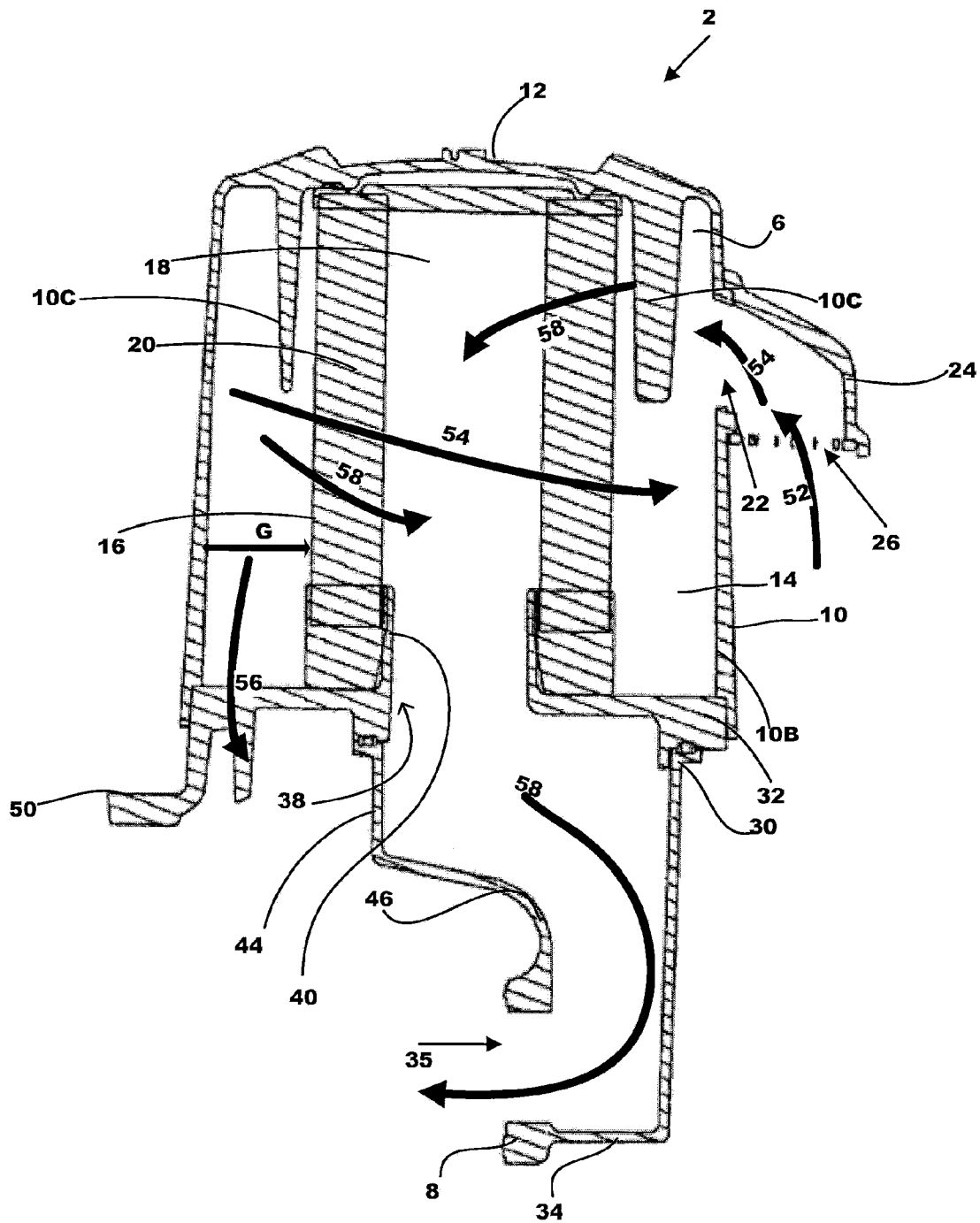
FIG. 11 is a schematic cross-sectional view of the air cleaner device as viewed along lines 6-6 of FIG. 1 rotated 180 degrees, showing certain components of the air cleaner device and importantly illustrating air flow therethrough, in accordance with at least some embodiments of the present invention.

Referring particularly to FIG. 5, as indicated above, the filter element 16 is disposed concentrically and axially within the interior chamber 14 with a certain gap or space G between the filter element and the outer wall 10B (it should be noted that the gap G does not generally extend through the entire width of the air cleaner device 2, as additionally shown in FIG. 11) of the housing 6 such that air entering the air cleaner device 2 is circulated around and about the filter element 16 in a cyclonic fashion to remove particulate matter therefrom. Additionally, the filter element 16 is designed to define a filter chamber 18 (e.g., a tubular structure or any other hollow structure) surrounded or substantially surrounded by a filtering media 20. By virtue of the filter chamber 18 and the filtering media 20, the filter element 16 serves as a sieve in which particulate matter from the air is removed as that air passes through the filtering media and into the filter chamber. The clean (or filtered) air from the filter chamber 18 then flows downwardly, exiting the air cleaner device 2 from the base 8. To ensure a leak-proof (or at least substantially leak-proof) conveyance of the clean air from the filter chamber 18 of the filter element 16 to the base 8, the filter element is releasably attached to the base, as described in greater detail below. Additional components such as seals and gaskets can be provided in between the filter and the base.

As indicated above, in addition to the filter element 16, the interior chamber 14 of the housing 6 has disposed therein the flange member 10C, which extends tangentially from the inner wall portion 10A to the outer wall portion 10B and further extends into the gap G to partially cover an opening 22 in the main housing portion 10. By virtue of the positioning the flange member 10C within the gap G, the flange member enables the incoming intake air to be deflected into a cyclonic (e.g., spiral-like) movement around the filter element 16. In other embodiments, other such mechanisms can be used to facilitate cyclonic motion of the incoming intake air. Further, the opening 22 provides an entryway for intake air flowing from an inlet duct 24 to the interior chamber 14.

Still referring generally to FIGS. 1-10 and particularly to FIGS. 1 and 5, the inlet duct 24 defines a passageway that extends along and/or adjacent (e.g., tangentially) an exterior circumferential surface of the outer wall portion 10B, and further extends downwardly (e.g., at a 90 degree or substantially 90 degree curve) towards the base 8 of the air cleaner device 2 and terminates in an inlet (or inlet opening) 26. Advantageously, the orientation of the inlet duct 24 prevents fluids, such as rain or spray from a pressure washer from entering directly into the air cleaner housing 6 through the inlet 26. In addition, to prevent larger debris material or rodents from entering into the air cleaner device 2, the inlet 26 has attached thereto a protective screen 28. The protective screen 28 can take the form of any of a variety of grills, webs, lattices or grids. Other configurations of the protective screen 28 are contemplated and considered within the scope of the present invention.

Now referring particularly to FIGS. 9 and 10, the base 8 includes a top portion 30 having a base plate 32 and a bottom portion 34 having an outlet (or outlet opening) 35 for releasing clean (or filtered) air from the housing 6 into the engine 4. The base plate 32 is generally designed to conform to the shape and size of the housing 6 and includes a pair of fasteners 36 for ensuring a secure and tight fitting connection between the base 8 and the housing. In some embodiments, more than two, or potentially even a single fastener, such as a clasp or clasp-like mechanism(s), for connecting the housing 6 to the base 8 can be provided as well. Conventional gasket or sealing mechanisms can be provided in between the housing 6 and the base 8 to provide an air tight and secure seal therebetween.

In addition to the fasteners 36, the base plate 32 has formed in a central or substantially central portion thereof a slot or opening 38 (see FIG. 11), through which extends a tubular connector element 40 for connecting the filter element 16 to the base 8. In particular, a top portion (or edge) 42 of the connector element 40 is connected to the filter element 16, while a bottom portion 44 of the connector element is connected via a passage 46 (again, described further with respect to FIG. 11) to the outlet 35. Thus, filtered air from the filter chamber 18 of the filter element 16 flows downwardly from the housing 6 towards the base 8, where that filtered air is transferred through the connector element 40, via the slot 38 and out of the outlet 35.

In addition to the aforementioned components, the base 8 can include a collection area 48 for collecting the dust and debris removed from the intake air via the cyclonic action. The collection area 48 further includes a hole or slot 49 (See FIG. 5), where the hole is visible through the gap G for allowing the built up dirt to exit from the air cleaner device 2. Further, the collection area 48 can be integrally formed with the base 8 (e.g., the base plate 32) or alternatively, can be separately connected to the base. Although not described, it should be understood that various conventional components like gaskets, seals, supports and other connecting structures and platforms that can be employed as part of, in conjunction or combination with the base 8 are contemplated and considered within the scope of the present invention. Also provided on the base 8 is an appendage or tab 50 having a hole 51 for connecting the air cleaner device 2 to an external structure by any of a variety of nuts, bolts and/or screws passing through the hole 51.

Further, the housing 6 including the main housing portion 10 and the cover housing portion 12 and the base 8 can be constructed out of a variety of materials. For example, in some embodiments, each of the housing main portion 10, the base 8 and the cover housing portion 12 can be made out of an injection molded plastic. In other embodiments, aluminum castings, stamped sheet metal and/or other engineered plastic or metal elements can be employed. In alternate embodiments, other types of light-weight and/or corrosion resistant materials can be employed as well. Additionally and notwithstanding the illustrated profiles of each of the housing 6 (the main housing portion 10 and the cover housing portion 12) and the base 8 in the present embodiment, it is nevertheless intended that in other embodiments, various other shapes and configurations can be employed for each of the housing and the base. Additionally, the inlet duct 24 can be constructed out of one or more of the aforementioned materials as well.

Referring again to FIG. 11, in operation and in accordance with at least some embodiments of the present invention, intake air laden with dust and other particulate and abrasive matter enters the housing 6 via the inlet 26 of the inlet duct 24 and through the opening 22 (as shown by arrow 52). Particularly, the intake air enters upwardly and axially, with at least a portion of that air entering circumferentially through the inlet 26 and travels through the inlet duct 24 to enter the housing 6 (e.g., via the opening 22) in a radial direction. Within the housing 6, the dust laden intake air is deflected tangentially at a high velocity, thereby imparting on the air a rotary, cyclonic or circumferential-type motion. Generally speaking, deflection of the intake air within the housing 6 is achieved by way of the flange member 10C, which in at least some embodiments can extend downwardly and perpendicularly from the cover housing portion 12. In addition to the rotary motion in a tangential direction, the intake air also moves in a radial direction through the filter element 16 and further, axially downwardly towards the base 8 for separation of particulate matter. In at least some embodiments, the dust laden intake air can move upwardly towards the cover housing portion 12 in a cyclonic motion and then axially downwardly, aided in part by gravity, to be imparted with a vortex-type motion for separation of particulate matter from the intake air. Thus, once inside the interior chamber 14, the intake air circulates axially as well as circularly (as shown by arrows 54) in a cyclonic fashion about the filter element 16 to separate dirt from the intake air. Indeed, the air cleaner employs a centrifugal action for separating dust from the intake air, particularly insofar as radial acceleration or centrifugal force is used to separate the dirt particles from the air. Thus, the air cleaner device 2 of the present invention is a centrifugal-type device employing a vortex or cyclonic separator for providing clean (or filtered) air to the engine 4.

By virtue of the high velocity and the circular (or cyclonic) motion of the intake air within the interior chamber 14, the heavier dust particles separated from the intake air are moved outwardly towards the outer wall 10B of the main portion 10 of the housing 6. Those separated dust particles then move downwardly (as shown by arrow 56) from the outer wall 10B, aided by gravity, to collect into the collection area 48 of the base 8. The collected dust is then removed through the hole 49 (see FIG. 5) of the collection area 48. In general, the internal combustion engine 4 generates a positive pressure pulse when an intake valve thereof closes. This positive pressure helps push the built up dirt out through the hole 49 of the collection area 48.

Further, the remaining intake air (intake air with the heavier dust particles removed due to the cyclonic action) is then filtered through the filtering media 20 of the filter element 16 such that any remaining finer dust particles are sieved through and clean (or filtered) air is passed into the filter chamber 18 (as shown by arrows 58). The clean air then exits through the center of the filter chamber 18 via the opening 38, into the passage 46 and out through the outlet 35 in the base 8 (again, as shown by the arrows 58). The clean intake air exiting the air cleaner device 2 is then provided to the engine 4.

Thus, intake (or combustion) air is drawn into the air cleaner device 2 through the opening 22 via the inlet 26 of the inlet duct 24 and deflected by way of the flange 10C within the interior chamber 14 around the filter element 16 in a cyclonic motion. As described above, the cyclonic motion of the air causes a first filtering operation to remove heavy contaminant particles, while passage of the air through the filtering media 20 into the filter chamber 18 of the filter element 16 constitutes a second filtering operation removing any finer particles, thereby resulting in removal of contaminants from the intake air. The filtered clean air flows through the filter chamber 18 of the filter element 16 towards the base 8 and exits out of the outlet opening 35 into the engine 4.

In contrast to conventional air cleaners that require pre-cleaner (or pre-cleaning) devices, the present invention provides an air cleaner device which eliminates the need for a separate pre-cleaner device, particularly insofar as the air cleaner device 2 provides mechanisms for both pre-cleaning and cleaning the intake air. To the extent that the air cleaner device 2 encompasses both pre-cleaning and cleaning, the air cleaner device extends the life of the filter element 16 as compared to traditional air cleaners, while improving the quality of filtering. Additionally, by virtue of incorporating the features of both pre-cleaner and air cleaner devices, the air cleaner device 2 of the present invention provides a reduced package size such that the footprint or the envelope of the space required to attach the air cleaner to the engine 4 is substantially reduced. In addition, the air cleaner device 2 provides considerable cost savings to the equipment owner. Thus, the air cleaner device 2 presents significant advantages over conventional air cleaner devices providing a space saving, compact, economical and effective air cleaner device. Embodiments of the present invention can be particularly beneficial insofar as the air cleaner device 2 incorporates features of both a pre-cleaning device and an air cleaner device.

In addition to the foregoing, the air cleaner device 2 is optimally designed to effectively and consistently operate at both high and low temperatures. Particularly, the position of the inlet duct 24 about the engine 4 can be altered depending upon the outside temperatures, or more particularly, depending upon the summer and the winter conditions. The summer and the winter positions of the air cleaner device 2 are shown and explained in greater detail with regard to FIGS. 12 and 13.

Referring now to FIGS. 12 and 13, summer and winter positions (or configurations), respectively, of the air cleaner device 2 are shown in accordance with at least some embodiments of the present invention. Referring particularly to FIG. 12, the summer configuration shows the engine 4 having a muffler 60, a fuel tank 62 and an air cleaner device 64 in operational association with one another. Although various structures and components including, for example, carburetors, crankcases, intake manifolds and other related parts of a typical internal combustion engine are not illustrated, the configuration, relative operation and arrangement of such components is readily available and well known in the art. Therefore, for simplicity and conciseness of expression, a detailed illustration of the engine 4 and any related components is not provided. Nevertheless, such components are contemplated and considered within the scope of the present invention.

Further, as shown, the air cleaner device 64 is designed to allow positioning an inlet duct 66 thereof towards a cool air location for room temperature to high temperature operating environments. Such positioning is similarly applicable for moderate to high ambient temperature operating environments. By virtue of positioning the inlet duct 66 towards the cool air position within the engine 4, the cleaned air entering the engine does not over-heat the carburetor and the engine. Advantageously, the summer position of the air cleaner device 64 can be changed to the winter position, shown in FIG. 13, by merely changing the position of the inlet duct 66.

Specifically, in the winter position shown in FIG. 13, the inlet duct 66 can be positioned near the muffler 60 to allow heated air to enter the engine 4 during conditions where carburetor icing is a possibility, for example, due to an operating environment having a low ambient temperature. The winter configuration (also known herein as an anti-icing configuration) utilizes heat from the muffler 60 to prevent subsequent ice-build up in the carburetor and the intake manifold during cold weather operation. Thus, the present air cleaner device 64 advantageously provides optimal operation during both the summer and the winter months.

While FIGS. 1-13 as described above show an exemplary embodiment of a cyclonic-type air cleaner device having winter and summer configurations, the present invention is intended to encompass a variety of alternative embodiments having one or more features differing from those described above. For example, in at least some alternate embodiments, the shapes, sizes, orientations and material of construction of the various components employed in the air cleaner device can vary from those shown in FIGS. 1-13. Relatedly, various components associated with a conventional air cleaner device, such as gaskets, seals, hoses and other related structures, are not shown in the figures. Such aforementioned components and the manner of operation thereof are readily available and known to people of skill in the art. The absence of a detailed illustration of such components of the air cleaner device 2 herein is also merely for clarification purposes and conciseness of expression. Use of such components is, however, contemplated and considered within the scope of the present invention.

Also, it is contemplated that embodiments of the present invention are applicable to engines that have less than one liter in displacement, or engines that both have less than one liter in displacement and fit within the guidelines specified by the above-mentioned regulations. In still further embodiments, the present invention is intended to encompass other small engines, large spark ignition (LSI) engines, Electronic Fuel Injection (EFI) engines, Compression Ignition (CI) engines, and/or other larger (mid-size or even large) engines. In additional embodiments, the present invention is intended to be used with other single or multi-cylinder engines as well.

Further, despite any method(s) being outlined in a step-by-step sequence, the completion of acts or steps in a particular chronological order is not mandatory. Further, modification, rearrangement, combination, reordering, or the like, of acts or steps is contemplated and considered within the scope of the description and claims.

It is specifically intended that the present invention not be limited to the embodiments and illustrations contained herein, but include modified forms of those embodiments including portions of the embodiments and combinations of elements of different embodiments as come within the scope of the following claims.

We claim:

1. An air cleaner comprising:
   a housing defining a chamber therewithin;
   a filter element disposed within the chamber of the housing;
   a duct element having a passageway in fluid communication with the chamber of the housing, the duct element extending along and downwardly from about a top portion of the housing, the duct element further comprising an inlet for drawing intake air into the chamber; and
   a base member in fluid communication with the chamber of the housing and having an outlet, the base member for releasably securing a bottom portion of the housing thereto;
   wherein the air drawn into the chamber of the housing is filtered by first and second filtering operations to obtain filtered air, the first and the second filtering operations accomplished at least in part due to a cyclonic motion of the air and passage of the air through the filter element, respectively; and
   wherein the filtered air from the chamber of the housing is released through the outlet in the base member.

2. The air cleaner of claim 1, wherein the base member comprises a first portion that is in fluid communication with the chamber of the housing, and comprises a second portion having the outlet and in fluid communication with the first portion, and
   wherein the first filtering operation results in removal of heavier particulate matter from the intake air.

3. The air cleaner of claim 2, wherein, due to the cyclonic motion of the intake air, at least some of the heavier particulate matter moves outwardly and downwardly within the chamber towards the base for collection, the downward motion of the particulate matter aided at least in part by gravity.

4. The air cleaner of claim 3, wherein the second filtering operation causes removal of finer particulate matter from the intake air.

5. The air cleaner of claim 1, wherein the second filtering operation causes removal of finer particulate matter from the intake air.

6. An air cleaner comprising:
   a housing having a top portion and a bottom portion and having a chamber therewithin;
   a filter element disposed within the chamber of the housing;
   a duct element having a passageway in fluid communication with the chamber of the housing, and having an inlet for drawing intake air into the chamber;
   a base member for releasably securing the bottom portion of the housing thereto, the base member comprising a first portion in fluid communication with the chamber of the housing, and a second portion having an outlet and in fluid communication with the first portion.

7. The air cleaner of claim 6, wherein the intake air is drawn into the chamber of the housing through the inlet of the duct element and the duct element passageway and a cyclonic motion is imparted to the intake air.

8. The air cleaner of claim 6, wherein a first filtering operation is facilitated at least in part due to a cyclonic motion imparted to the intake air and a second filtering operation is facilitated by flowing at least a second portion of the intake air through the filter element, the first and the second filtering operations for separating particulate matter from the intake air to obtain filtered air.

9. The air cleaner of claim 8, wherein the first filtering operation results in removal of heavier particulate matter from the intake air;
   wherein the second filtering operation causes removal of finer particulate matter from the intake air; and
   wherein the heavier particulate matter is heavier than the finer particulate matter.

10. The air cleaner of claim 9, wherein due to the cyclonic motion of the intake air, at least some of the heavier particulate matter moves outwardly and downwardly within the chamber towards the base for collection, the downward motion of the particulate matter aided at least in part by gravity.

11. The air cleaner of claim 9, wherein the intake air is subjected to the first filtering operation before being subjected to the second filtering operation.

12. The air cleaner of claim 6, wherein the first portion of the base further comprises a collection portion for collecting a separated particulate matter from the intake air and having an opening for removal of the collected particulate matter.

13. The air cleaner of claim 6, wherein the inlet duct is positioned towards a cool air engine location for operating environments having a moderate to high ambient temperature.

14. The air cleaner of claim 6, wherein the inlet duct is positioned towards a warm air engine location for operating environments having a low ambient temperature.

15. The air cleaner of claim 6, further comprising a flange member disposed within the chamber of the housing.

16. The air cleaner of claim 15, wherein the flange member is positioned and configured to deflect at least a portion of the intake air into the cyclonic motion.

17. The air cleaner of claim 15, wherein the housing includes a housing main portion that comprises an inner wall portion and an outward wall portion that are connected, at least in part, by the flange member.

18. An internal combustion engine comprising:
    a muffler; and
    an air cleaner, the air cleaner comprising:

a housing having a top portion and a bottom portion and having a chamber therewithin;

a filter element disposed within the chamber of the housing;

a duct element having a passageway in fluid communication with the chamber of the housing, and having an inlet for drawing intake air into the chamber;

a base member for releasably securing the bottom portion of the housing thereto, the base member comprising a first portion in fluid communication with the chamber of the housing, and a second portion having an outlet and in fluid communication with the first portion.

19. The internal combustion engine of claim 18, wherein the intake air is drawn into the chamber of the housing through the inlet of the duct element and the duct element passageway and a cyclonic motion is imparted to the intake air.

20. The internal combustion engine of claim 18, wherein a first filtering operation is facilitated at least in part due to the cyclonic motion of the intake air and a second filtering operation is facilitated by flowing at least a second portion of the intake air through the filter element, the first and the second filtering operations for separating particulate matter from the intake air to obtain filtered air.

\* \* \* \* \*